US008155336B2

(12) United States Patent
Tang

(10) Patent No.: US 8,155,336 B2
(45) Date of Patent: Apr. 10, 2012

(54) WIRELESS HEADSET WITH INTEGRATED MEDIA PLAYER

(75) Inventor: John Tang, San Carlos, CA (US)

(73) Assignee: Apple Inc., Cupertino, CA (US)

(*) Notice: Subject to any disclaimer, the term of this patent is extended or adjusted under 35 U.S.C. 154(b) by 1016 days.

(21) Appl. No.: 12/111,581

(22) Filed: Apr. 29, 2008

(65) Prior Publication Data

US 2009/0268921 A1 Oct. 29, 2009

(51) Int. Cl.
*H04R 1/10* (2006.01)
*H04R 25/00* (2006.01)
*H04M 1/00* (2006.01)

(52) U.S. Cl. ....... 381/74; 381/370; 381/375; 455/575.2; 455/569.1

(58) Field of Classification Search .................... 381/74, 381/370, 375; 455/575.2, 569.1
See application file for complete search history.

(56) References Cited

U.S. PATENT DOCUMENTS

| | | | | |
|---|---|---|---|---|
| 6,078,825 | A * | 6/2000 | Hahn et al. | 455/569.2 |
| 6,856,817 | B2 * | 2/2005 | Tischler | 455/569.1 |
| D579,923 | S | 11/2008 | Andre et al. | |
| 7,798,831 | B2 | 9/2010 | Sanford et al. | |
| 7,810,750 | B2 * | 10/2010 | Abreu | 242/378.1 |
| 2002/0003889 | A1 * | 1/2002 | Fischer | 381/370 |
| 2003/0157972 | A1 * | 8/2003 | Bae | 455/568 |
| 2004/0058647 | A1 * | 3/2004 | Zhang et al. | 455/41.2 |
| 2005/0202857 | A1 * | 9/2005 | Seshadri et al. | 455/575.2 |
| 2006/0030360 | A1 * | 2/2006 | Yeh | 455/557 |
| 2006/0240692 | A1 * | 10/2006 | Regen et al. | 439/131 |
| 2007/0019819 | A1 * | 1/2007 | Garcia | 381/74 |
| 2007/0037605 | A1 * | 2/2007 | Logan | 455/567 |
| 2007/0133836 | A1 * | 6/2007 | Lee | 381/370 |
| 2007/0135186 | A1 * | 6/2007 | Lee | 455/575.2 |
| 2007/0249411 | A1 * | 10/2007 | Hyatt | 455/569.1 |
| 2008/0132293 | A1 * | 6/2008 | Gundlach et al. | 455/569.1 |
| 2008/0164825 | A1 | 7/2008 | Terlizzi et al. | |
| 2008/0175399 | A1 * | 7/2008 | Kim et al. | 381/57 |
| 2008/0298578 | A1 * | 12/2008 | Regen et al. | 379/430 |
| 2009/0154740 | A1 * | 6/2009 | Regen et al. | 381/311 |
| 2009/0191920 | A1 * | 7/2009 | Regen et al. | 455/566 |

(Continued)

OTHER PUBLICATIONS

Engadget, "Bluetrek's Bizz Bluetooth headset improves your memory," http://www.engadget.com/2008/02/27/bluetreks-bizz-bluetooth-headset-improves-your-memory/, accessed on Feb. 27, 2008.

*Primary Examiner* — Zandra Smith
*Assistant Examiner* — Jeremy Joy
(74) *Attorney, Agent, or Firm* — Ropes & Gray LLP; Jeffrey H. Ingerman

(57) ABSTRACT

Additional functionality in a wireless headset allows it to be used during times that the external device with which it is wirelessly coupled is not being used, but when the headset is nevertheless being worn. This is accomplished by integrating a media player into the wireless headset. The media player may be an audio player, capable, e.g., of playing audio files such as MPEG-3 ("MP3") files. Optionally, the media player may include a recording function as well, so that a user can record voice notes. In addition, if the external device is a telephone (mobile or landline), the availability of a recording function could make it possible for the user to record all or part of a conversation. Similarly, voicemail messages received on the user's telephone could be uploaded into the headset for later off-line playback. Media files recorded by the headset also could be downloaded to the external device.

17 Claims, 4 Drawing Sheets

U.S. PATENT DOCUMENTS

2009/0200648 A1 8/2009 Graves, Jr. et al.
2009/0203318 A1 * 8/2009 Haan ............................ 455/41.3
2009/0215502 A1 * 8/2009 Griffin, Jr. .................. 455/569.1
2010/0022269 A1 1/2010 Terlizzi
2010/0083188 A1 4/2010 Pance et al.
2011/0038114 A1 2/2011 Pance et al.

* cited by examiner

WIRELESS HEADSET WITH INTEGRATED MEDIA PLAYER

BACKGROUND OF THE INVENTION

This invention relates to a wireless headset integrated with a media player.

Wireless headsets for devices with audio inputs and outputs are well known. For example, headsets using the low-power spread-spectrum protocol known as BLUETOOTH® are commonly used with, e.g., mobile telephones, media players, electronic game consoles, radios and television sets. When used with mobile telephones, such headsets are frequently worn continually by their users, even when not engaged in telephone calls, because it is too inconvenient to have to reinsert the headset in one's ear each time a call comes in, while the phone is ringing and before the caller gives up and disconnects. Therefore, such headsets may be idle most of the time that they are being worn.

It also is known to provide such headsets with connectors to allow their rechargeable batteries to be charged. In some cases, the connector is a Universal Serial Bus (USB) connector, allowing the headset to be charged by plugging it into the USB port of a computer or other device.

SUMMARY OF THE INVENTION

The present invention recaptures headset idle time by providing additional functionality in a wireless headset that allows it to be used during times that the device with which it is wirelessly coupled is not being used, but when the headset is nevertheless being worn. This is accomplished by integrating a media player into the wireless headset.

The media player may be an audio player, capable, e.g., of playing audio files such as MPEG-3 ("MP3") files. Optionally, the media player may include a recording function as well, so that a user can record voice notes. In addition, if the headset is being used with a telephone (mobile or landline), the availability of a recording function could make it possible for the user to record all or part of a conversation. Similarly, voicemail messages received on the user's telephone could be uploaded into the headset for later off-line playback.

The same connection that is used to charge the headset also could be used to load the media player, or to download any recording made using the recording function (if provided). Thus, where a USB connection is provided for charging from the USB port of a computer, that same connection could be used for uploading and downloading content files which, in addition to the aforementioned voicemail messages and recorded conversations, could be any other type of audio file—i.e., podcast, music, etc. Alternatively, a connection may be provided for a cable that could connect to any suitable port, including, but not limited to, a USB port, on a computer for uploading and downloading content. If that connection is not a USB connection or other connection that also can supply power, then a separate connection for a power cord to charge the headset/media player device may be provided. In a further alternative, the headset's wireless connection could be used for uploading and downloading content.

In addition, provision of a media player in the headset allows playback totally within the headset, without any active connection-wired or wireless—to the host device (e.g., telephone handset). This eliminates dependency on the host device for playback data and reduces power consumption of both the headset (because it does not need to use its wireless connection to receive the playback data) and the host device, which is important if the host device is itself a portable device such as a telephone handset.

Wireless headsets of this type typically are monaural. While in one embodiment, a headset with integrated media player according to the invention would remain monaural, in another embodiment, the integrated headset/media player could be a stereo headset. In still another embodiment, a monaural headset with a permanent or optional second earpiece, to allow stereo operation if desired, could be provided.

Wireless headsets of this type typically have a small form factor. Accordingly, not much room is available for a user interface for the media player portion of the integrated headset/media player. In accordance with the invention, a minimal user interface may be provided that allows the user to select stopping and starting of playback of stored content, as well as control of recording. For example, small "start," "stop," and "record" buttons may be provided. Corresponding visual indicators, such as light-emitting diodes, might also be provided as an indication of the current operating mode. The playback mode may be a fixed sequential mode, or another mode such as a random playback mode, or successive presses of the "start" button may cycle through different playback modes.

Alternatively, given the presence of a microphone in the headset (primarily for use with a telephone), the media player could be configured to respond to voice commands, which could allow more complex commands, including commands to play particular content. In addition, the microphone could be used to detect the ambient noise level, and to adjust playback volume accordingly.

Therefore, in accordance with the present invention, there is provided a wireless headset including a speaker, a wireless receiver that receives wireless audio signals from an external device for playback through the speaker, memory for storing media files, and media circuitry including playback circuitry for playing back those media files through the speaker.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which.

DETAILED DESCRIPTION

Figure 1:
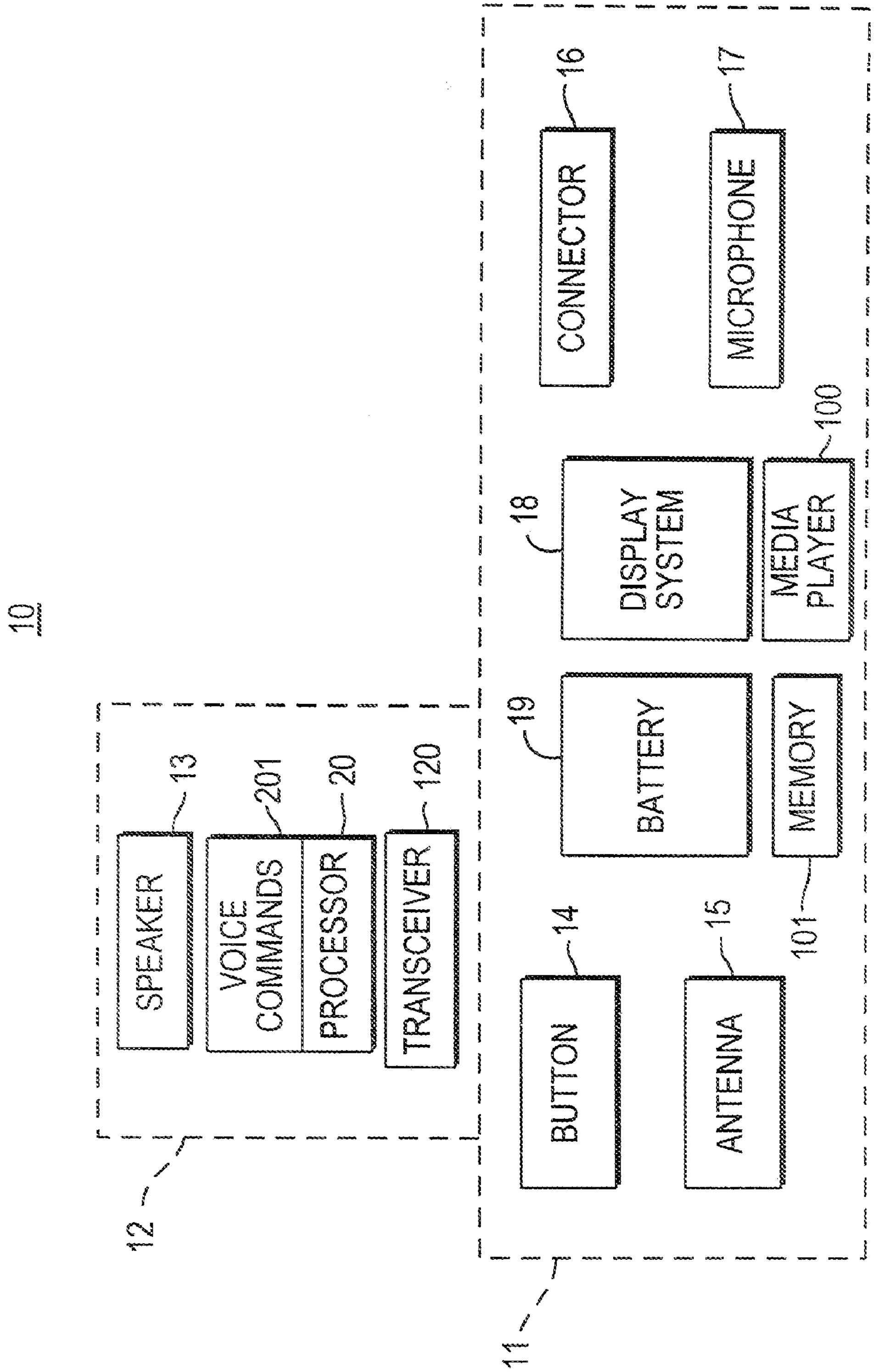
FIG. 1 is a simplified block diagram of a headset in accordance with an embodiment of the present invention.

The general configuration of headsets of the type in which the present invention may be used is shown in copending, commonly-assigned U.S. patent application Ser. No. 11/824,203, filed Jun. 28, 2007, which is hereby incorporated by reference herein in its entirety. While the size, shape and weight of such headsets may vary according to user preference and aesthetic considerations, a general configuration of such a headset is shown in block diagram form in FIG. 1.

Headset 10 can be configured to be a small compact unit in the form of a simple earpiece that can be placed in a user's ear. The headset can include a primary housing 11 and an earbud 12 that extends from the primary housing. Earbud 12 can fit into the user's ear thereby placing the primary housing next to the user's face. Earbud 12 alone may retain headset 10 in the user's ear, or a retaining arm—which may be curved—may be provided that wraps around the user's ear or the user's head. Each of these members can surround and protect various internal components and can also support thereon various external components associated with operating headset 10. The components may be a plurality of electrical components that provide specific functions for the electronic device. For example, the components may generally be associated with generating, receiving, and/or transmitting data associated with operating the device.

Headset 10 may include a processor 20 for controlling the headset's functions. In the illustrated embodiment, processor 20 can be provided in earbud 12. In other embodiments, processor 20 can be located anywhere in headset 10. Processor 20 can be electrically coupled to the other components of headset 10 through circuit boards and/or cables. Processor 20 may facilitate wireless communications with a host device in conjunction with transceiver 120 and antenna 15. For example, processor 20 can generate signals for wireless transmission and process received wireless signals, in accordance with the aforementioned BLUETOOTH® protocol or other communications standard. In addition to facilitating wireless communications, processor 20 may coordinate the operation of the various components of headset 10. For example, processor 20 may control the charging of a battery 19 or the operation of a display system 18.

Headset 10 also includes speaker system 13 for distributing audio information from earbud 12. Speaker system 13 can include an audio port at the end of the earbud and a speaker disposed adjacent the audio port. The audio port may be covered with a grill.

Headset 10 also includes one or more input mechanisms for providing inputs to the headset. The input mechanism may be placed at primary housing 11 and/or at earbud 12. The input mechanisms may be widely varied and may include for example slide switches, depressible buttons, dials, wheels, navigation pads, touch pads, and/or the like. For aesthetic reasons, the input mechanism may be placed at a select location.

Headset 10 also includes a communication terminal for communicating with a host device. The communication terminal may be configured for wired or wireless connections. In the illustrated embodiment, the communication terminal is antenna 15 that supports wireless connections, such as the aforementioned BLUETOOTH® protocol. Antenna 15 may be located internal to primary housing 11 or earbud 12. If primary housing 11 or earbud 12 is not formed from a radio-transparent material then a radio-transparent window may be provided. In the illustrated embodiment, antenna 15 is located at one end of the headset.

Headset 10 may also include one or more connectors 16 for transferring data and/or power to and from headset 10. A data connection allows data to be transmitted to and received from a host device. A power connection, on the other hand, allows power to be delivered to the headset. The connectors may for example connect to a corresponding connector in a dock or cable in order to connect to a power source for charging and/or a data source for downloads or uploads. Although the location of the connector can be widely varied, in some preferred embodiments, connector 16 may be located at one of the ends in order to preserve the appearance of the side surfaces of the primary housing.

Headset 10 also includes microphone 17 for capturing speech provided by the user. The microphone is typically located internal to primary housing 11. One or more acoustic ports 110 may be configured into primary housing 11 in order to provide an acoustical path from outside primary housing 11 to microphone 17. The location of acoustic ports 110 can be widely varied. In one embodiment, acoustic ports 110 may be located at one end of primary housing 11 in order to preserve the appearance of the sides of primary housing 11. In one embodiment, the connector assembly and acoustic ports 110 may be integrated at the same end. Furthermore, acoustic port 110 may be configured to be substantially hidden from view by selective placement of the ports. For example, the ports may be placed at the seam between the connector assembly and the primary housing. Similarly, any connector 16 may be covered by a removable cap.

As discussed above, the presence of microphone 17 may allow the provision of a voice-command interface 201 (controlled, e.g., by processor 20) to replace or supplement the various switches, etc., described above. In addition, processor 20 can adjust the volume level, once set by the user, to accommodate changes in ambient noise levels as detected by microphone 17.

Headset 10 may also include display system 18 for providing visual feedback. Display system 18 may be a complex display system comprising an LCD or other related display device capable of displaying graphical information and/or it may be an indicator assembly that only provides simple visual feedback as for example via an LED assembly. In one embodiment, display system 18 only comprises an indicator assembly that provides visual feedback along the side walls of the primary housing. In order to preserve the side walls, however, the indicator assembly may be hidden when inactive. This can be accomplished, for example, through microperforations in primary housing 11. The microperforations allow light to pass through, but are so small that they are undetectable to a user.

Headset 10 also includes battery 19. Battery 19 may provide electrical power to components of headset 10. Charging circuitry may also be provided to charge battery 19 when an external power supply is connected to headset 10.

Headset 10 can also include support circuitry for the aforementioned components. For example, this may include circuit boards, various electrical components, processors and controllers. The support circuitry can be placed inside primary housing 11 and/or earbud 12. In one embodiment, the support circuitry can be split or divided between the two locations in order to make a more compact device, i.e., the various electronics are distributed among volumes as needed. In order to further save space, the electronics may be stackable. In one embodiment, the electronics are placed on a circuit board with one or more flexible portions so that a stack is created by folding or bending the circuit board. The circuit boards can even be completely flexible to fit within the confined spaces of headset 10.

Earbud 12 and primary housing 11 can be integrally formed, or primary housing 11 and earbud 12 may be separate housing members that are attached together. Any suitable expedient can be used to attach the two parts together including but not limited to screws, glues, epoxies, clips, brackets, and the like.

Figure 2:
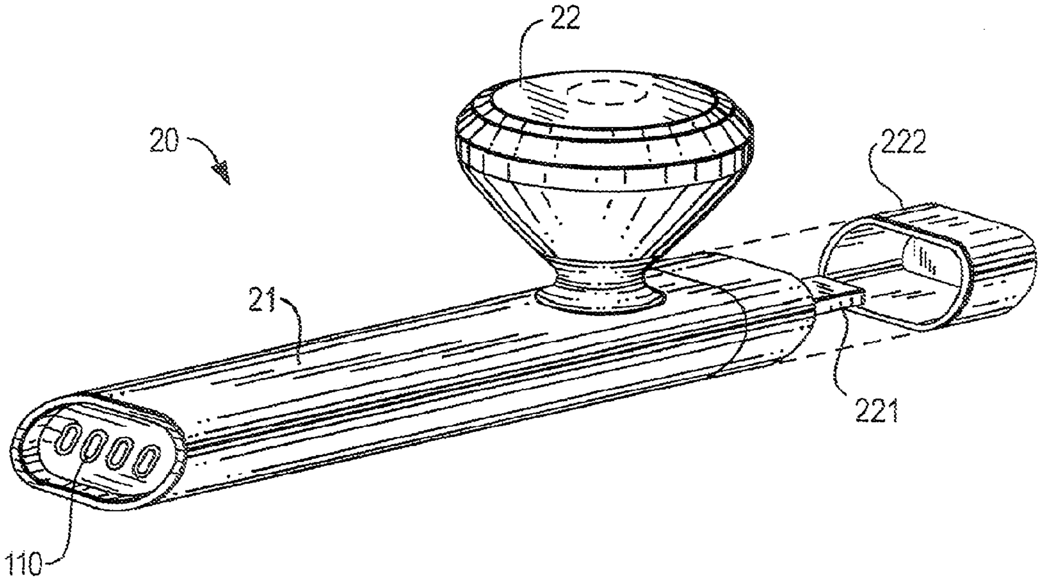
FIG. 2 is a first perspective view of a headset in accordance with an embodiment of the present invention.
Figure 3:
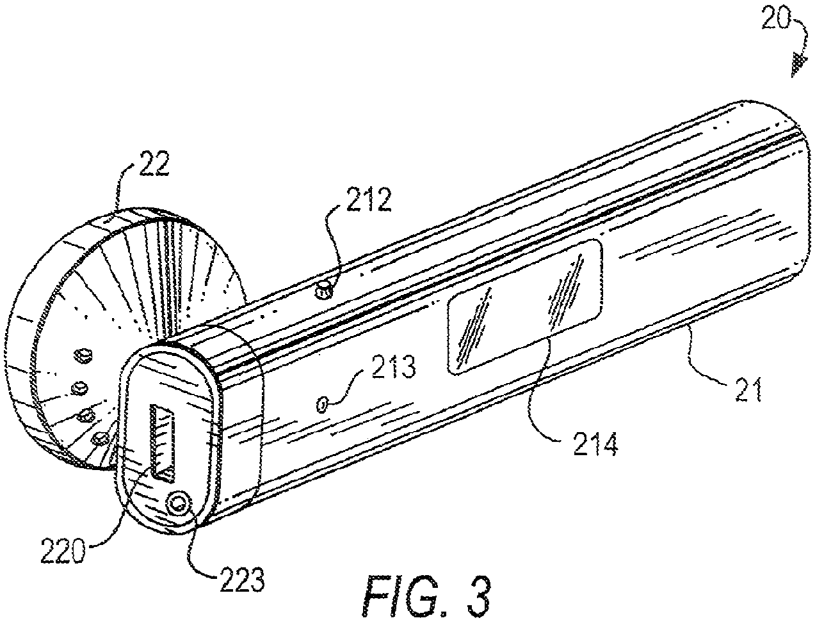
FIG. 3 is a second perspective view of the headset of FIG. 2.

FIGS. 2 and 3 show perspective views of an illustrative headset in which the present invention may be incorporated. Headset 20 can correspond to headset 10 of FIG. 1. For example, primary housing 21 can correspond to primary housing 11 and earbud 22 can correspond to earbud 12.

The aforementioned circuit boards within headset 10 may also include memory circuitry 101 for storing media content, as well as media player circuitry 100, which can perform known media playback functions on that content. Thus, the content could be played back seriatim, or in a random or "shuffled" mode, or, if a sufficiently robust user interface is provided, according to direct selection of particular content by the user. Media player circuitry 100 also can sample the ambient noise level via microphone 17 and adjust the playback volume accordingly. The primary volume adjustment may be made by the user using whatever volume control is provided on the headset for standard wireless headset uses, while circuitry 100 may vary the volume about that user adjustment.

Although any number of user interface options can be provided, one example of a user interface that may be provided is one or more buttons 212. For example, a different button can be provided for selecting each of the available playback modes (e.g., seriatim, random, etc. as discussed above), plus one additional button to stop playback. Alternatively, a single button might be used to cycle through the various playback modes, including the stop or "off" mode. Similarly, one or more indicators 213 (e.g., LED indicators) may be used to show which playback mode is in effect. In one embodiment, there may be a different indicator for each mode, while in another embodiment, there may be only one indicator with a changing display characteristic (e.g., color and/or duty cycle) that indicates the mode. Alternatively, a display screen 214, such as a small LCD screen, may be provided.

Media player circuitry 100 may also be able to make sound recordings for storage in memory 101. The source of sound for such recordings may be microphone 17, allowing the user to record voice memoranda, etc., and also may include sound played back through speaker 13. In the latter case, where both speaker 13 and microphone 17 may be sources of sounds for recording, the user may be able to record telephone conversations when the headset is being used for conducting a conversation over an associated telephone. In either case, a further button 212 may be provided to initiate the recording mode, or the recording mode may be one more mode through which the aforementioned single button 212 may cycle.

While content may be loaded into memory 101 using the recording mode just discussed, the user may want to upload into memory 101 other content, such as commercial musical recordings, as well as, e.g., voicemail messages received by a telephone with which headset 10 is used. The user also may want to be able to download from memory 101 content created in the recording mode. Such uploading and downloading could be accomplished by the wireless connection (e.g., a BLUETOOTH® connection) used to connect the headset to its associated device. Alternatively, a wired connection may be provided. Thus a cable connection 220 may be provided to attach such a cable, which could be a USB cable or other cable. Preferably, the cable connection 220 is located in an end of primary housing 21 or earbud 22, and is as flush with the surface as possible. Alternatively, if a USB connector 221 already is provided directly on some portion of headset 20 for charging purposes, that USB connector also may be used for uploads and downloads of content. Preferably, is USB connector 221 is provided, a removable cap 222 is provided to protect connector 221 when not in use, or connector 221 may be retractable. If a non-USB cable connection is provided, a separate jack 223 may be provided for connecting a power cord to charge headset 20.

Figure 4:
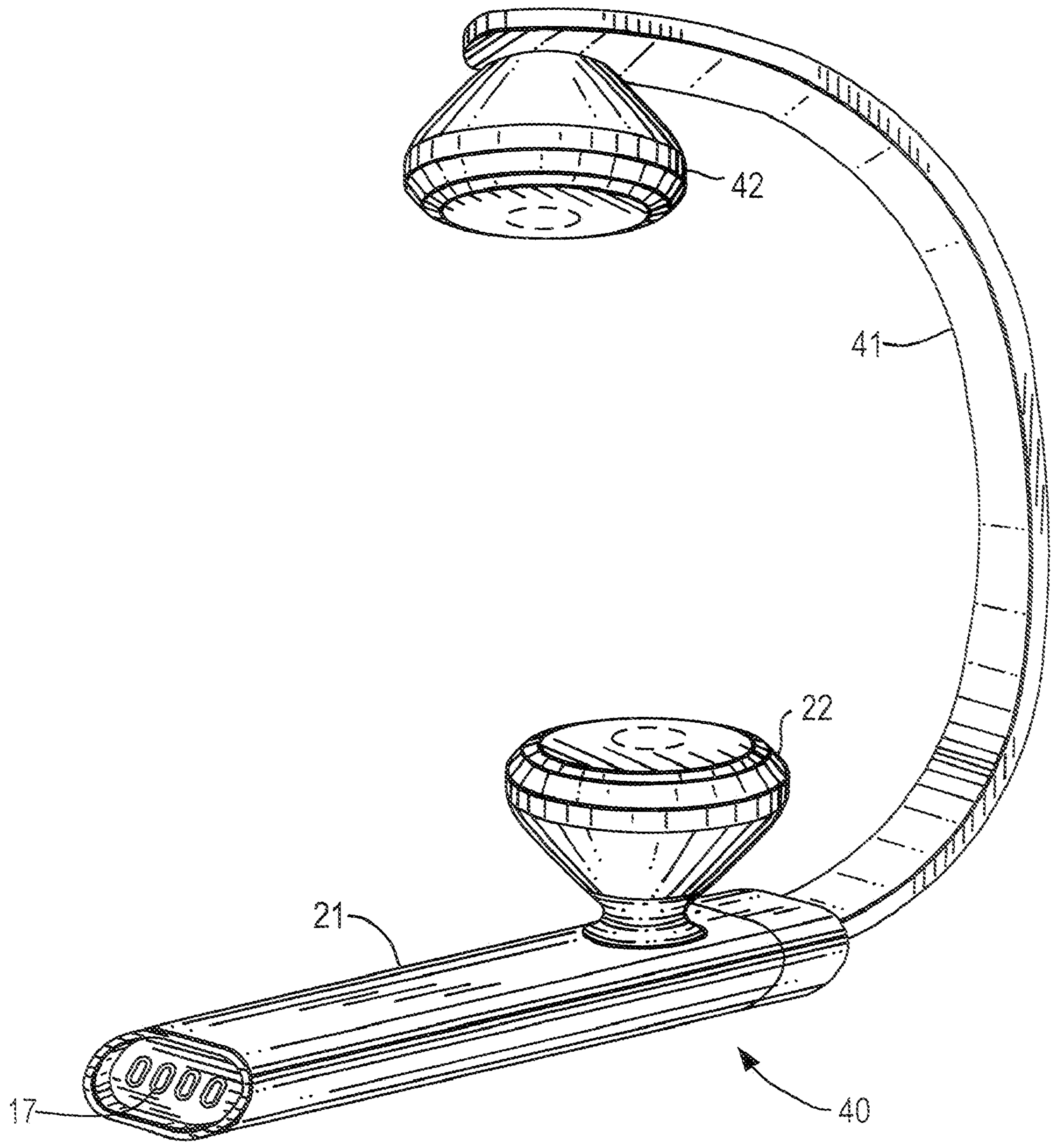
FIG. 4 is a perspective view of a headset in accordance with another embodiment of the present invention.
Figure 5:
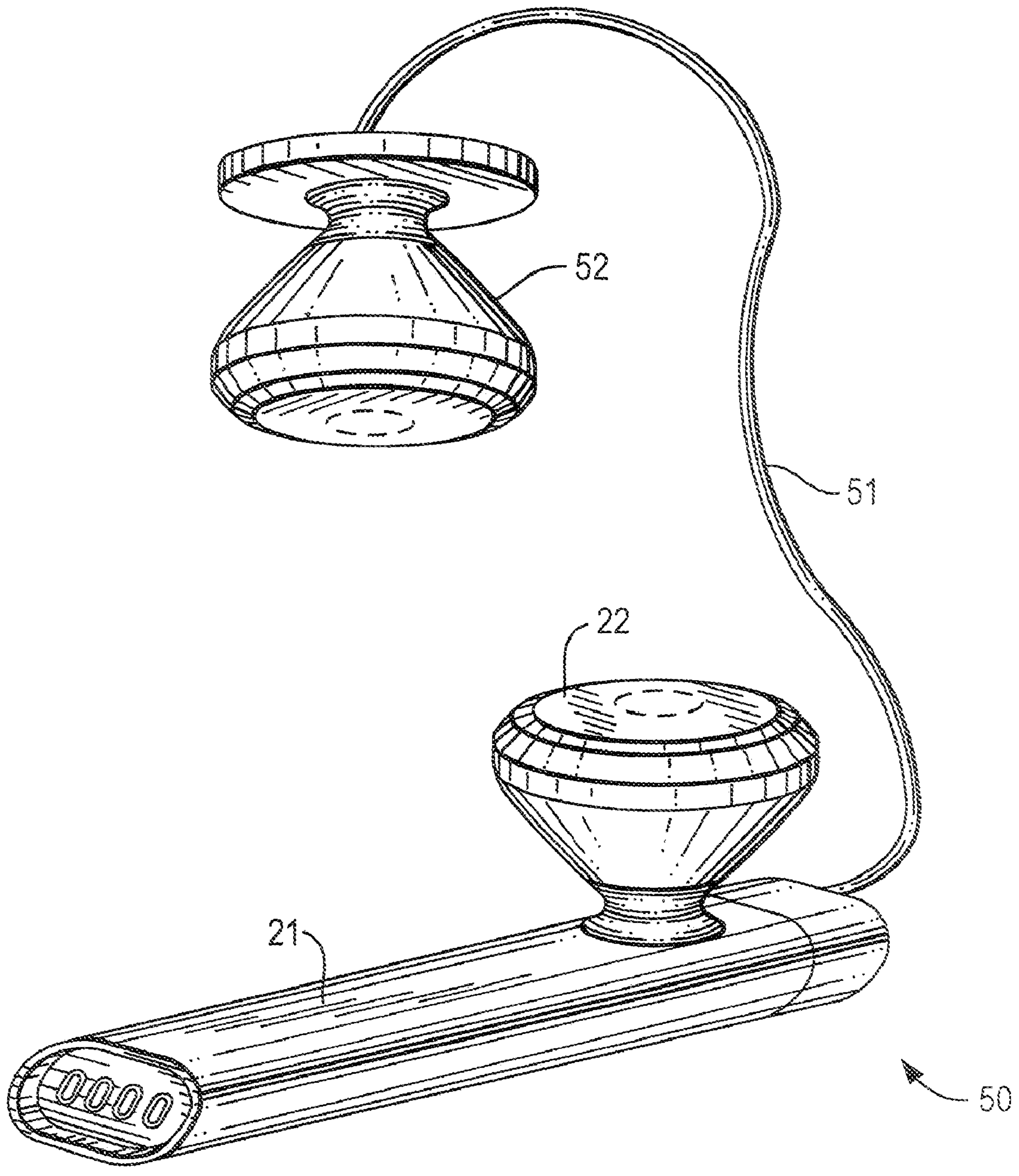
FIG. 5 is a perspective view of a headset in accordance with yet another embodiment of the present invention.

Headsets 10 and 20 as described thus far are monaural. However, media content frequently is recorded in stereo. Therefore, optionally, headset 40 could be provided which, as shown in FIG. 4, is a stereo headset, having, in addition to primary housing 21 and earbud 22, a secondary earbud 42 connected to primary housing 21 by arm 41. Arm 41 could be permanently attached, or could be both mechanically and electrically detachable so that headset 40 could be used in either monaural or stereo mode. Alternatively, instead of arm 41, a wire 51 can be used to connect secondary earbud 42 to primary housing 21, as shown in headset 50 of FIG. 5. Once again, wire 51 could be permanently attached, or may be detachable to allow monaural or stereo operation. For example, a user may want to have a stereo headset when in a leisure environment, but a monaural headset when in an environment in which the ability to hear ambient noises and sounds is important, such as while driving.

Thus it is seen that a wireless headset with integrated media player and/or recorder has been provided. It will be understood that the foregoing is only illustrative of the principles of the invention, and that various modifications can be made by those skilled in the art without departing from the scope and spirit of the invention, and the present invention is limited only by the claims that follow.

What is claimed is:

1. A wireless headset comprising:
- a housing;
- a speaker in said housing;
- a microphone in said housing;
- an acoustic port in said housing communicating with said microphone;
- a wireless transceiver in said housing that receives wireless audio signals from an external device for playback through said speaker, and sending wireless audio signals from said microphone to said external device;
- memory in said housing for storing media files;
- media circuitry in said housing including:
- playback circuitry for playing back said media files through said speaker, and
- recording circuitry for recording media files from said microphone;
- a battery in said housing for powering said speaker, said microphone, said transceiver, said memory and said circuitry; and
- a connector for at least one of charging said battery or transferring files to or from said memory circuitry; wherein:
- said acoustic port and said connector are located at one end of said housing.

2. The wireless headset of claim 1 further comprising a data link for at least one of (a) loading said media files into said memory, and (b) downloading said media files from said memory to said external device.

3. The wireless headset of claim 2 wherein said data link comprises said wireless transceiver.

4. The wireless headset of claim 3 wherein said wireless transceiver is an infrared transceiver.

5. The wireless headset of claim 3 wherein said wireless transceiver is a radiofrequency transceiver.

6. The wireless headset of claim 5 wherein said wireless transceiver is a low-power spread-spectrum radiofrequency transceiver.

7. The wireless headset of claim 6 wherein said wireless transceiver is a BLUETOOTH® transceiver.

8. The wireless headset of claim 2 wherein said data link comprises a wired connection.

9. The wireless headset of claim 8 wherein:

said connector is a Universal Serial Bus connector; and said wired connection comprises a Universal Serial Bus connection through said Universal Serial Bus connector.

10. The wireless headset of claim 1 further comprising:

a user interface for controlling said media circuitry.

11. The wireless headset of claim 10 wherein said user interface comprises a voice-command interface.

12. The wireless headset of claim 10 wherein said user interface comprises a selector for choosing a playback mode.

13. The wireless headset of claim 12 wherein said user interface comprises a display for indicating said playback mode.

14. The wireless headset of claim 13 wherein said display comprises at least one illuminated indicator.

15. The wireless headset of claim 14 wherein said display comprises a video screen.

16. The wireless headset of claim 14 wherein said at least one illuminated indicator is hidden when inactive.

17. A wireless headset comprising:

a primary housing;

an earbud housing affixed to said primary housing;

a speaker in said earbud housing;

a microphone;

a wireless transceiver that receives wireless audio signals from an external device for playback through said speaker, and sending wireless audio signals from said microphone to said external device;

memory for storing media files;

media circuitry including:

playback circuitry for playing back said media files through said speaker, and recording circuitry for recording media files from said microphone;

a battery for powering said speaker, said microphone, said transceiver, said memory and said circuitry; wherein:

at least a first portion of circuitry of at least one of said wireless transceiver, said memory and said media circuitry is located within said primary housing and at least a second portion of circuitry of at least one of said wireless transceiver, said memory and said media circuitry is located within said earbud housing.

* * * * *